United States Patent [19]
Kim

[11] Patent Number: 5,867,540
[45] Date of Patent: Feb. 2, 1999

[54] ECHO REMOVING SYSTEM BETWEEN A MOBILE COMMUNICATION SUBSCRIBER AND A FIXED COMMUNICATION SUBSCRIBER

[75] Inventor: Kang-Jou Kim, Kyonggi-do, Rep. of Korea

[73] Assignee: Hyundai Electronics Industries Co., Ltd., Kyonggi-do, Rep. of Korea

[21] Appl. No.: 769,089

[22] Filed: Dec. 18, 1996

[30] Foreign Application Priority Data

Dec. 19, 1995 [KR] Rep. of Korea .................. 1995 52267

[51] Int. Cl.⁶ .................................................. H04M 11/00
[52] U.S. Cl. .......................... 375/346; 455/570; 379/410; 370/287
[58] Field of Search ...................... 375/346, 340; 370/286, 287, 289; 455/422, 423, 501, 570; 379/389, 406, 410

[56] References Cited

U.S. PATENT DOCUMENTS

| | | | |
|---|---|---|---|
| 4,465,902 | 8/1984 | Zato | 179/2 |
| 4,843,621 | 6/1989 | Potratz | 379/58 |
| 5,247,512 | 9/1993 | Sugaya et al. | 370/32.1 |
| 5,381,475 | 1/1995 | Cavallo | 379/410 |
| 5,553,137 | 9/1996 | Nyhart et al. | 379/410 |

*Primary Examiner*—Chi H. Pham
*Assistant Examiner*—William Luther
*Attorney, Agent, or Firm*—McAulay Nissen Goldberg Kiel & Hand, LLp

[57] ABSTRACT

An improved echo removing system by which it is possible to more effectively remove echoes which occur during a wireless communication between a mobile communication subscriber and a fixed communication subscriber in a CDMA type mobile communication exchange system, which includes a signal input unit connected between the remote network/station interface unit and the first time switch connection unit for receiving a transmitting and receiving audio signal, an echo removing processor for detecting a difference between the transmitting audio signal and the receiving audio signal outputted from the signal input unit and for removing an echo component from the receiving audio signal in accordance with the control signal from the time switch connection/disconnection controller, and a second time switch connection unit for time-switching in order for the output signal from the echo removing processor to be transmitted to the mobile communication subscriber through the system inside connection unit in accordance with the control signal from the time switch connection/disconnection controller.

4 Claims, 4 Drawing Sheets

ECHO REMOVING SYSTEM BETWEEN A MOBILE COMMUNICATION SUBSCRIBER AND A FIXED COMMUNICATION SUBSCRIBER

BACKGROUND OF THE INVENTION

1. Field of the Invention

The present invention relates to an echo removing system, and in particular to an improved echo removing system which makes it possible to more effectively remove echoes which occur during a wireless communication between a mobile communication subscriber and a fixed communication subscriber in a code division multiple access (CDMA) type mobile communication exchange system.

2. Description of the Conventional Art

Generally, in the CDMA type mobile communication exchange system, during a wireless communication between a mobile communication subscriber and a fixed communication subscriber, an audio signal of the mobile communication subscriber is transmitted to the fixed communication subscriber through the mobile communication exchange system and a public switched telephone network (PSTN) which is a public analog telephone network for an audio signal transmission, respectively. During this communication operation, the echo occurs due to a mismatch of a hybrid impedance of lines 2 and 4 of a matching section of the fixed communication subscriber. The audio signal is delayed by about 180 msec due to a voice coding of a base station controller (BSC) of a public land mobile network (PLMN).

When this delayed audio signal is outputted to the mobile communication subscriber, the mobile communication subscriber may hear his/her echoed voice after speaking, for causing inconvenience when communication takes place between the mobile communication subscriber and the fixed communication subscriber.

Therefore, it is necessary to remove the echo which occurs in the matching section between the mobile communication subscriber and the fixed communication subscriber for enabling a quality communication therebetween.

When all the access subscriber subsystems (ASS) having an echo removing system may remove the echo by controlling the echo removing system, removing the echo may be made easier and simpler.

However, if all the ASSes are removed in such manner, the communication quality is degraded, and the echo removing system has to be disadvantageously installed, all the ASSes then requires the echo removing system as well.

SUMMARY OF THE INVENTION

Accordingly, it is an object of the present invention to provide an echo removing system which overcomes the problems encountered in the conventional echo removing system.

It is another object of the present invention to provide an improved echo removing system by which it is possible to more effectively remove echoes which occur during a wireless communication between a mobile communication subscriber and a fixed communication subscriber in a CDMA type mobile communication exchange system.

To achieve the above objects, there is provided an improved echo removing system which includes a time switch connection/disconnection controller for controlling an echo removing operation, a remote network/station interface unit to which a fixed communication subscriber is connected, a system inside connection unit connected with a system of a mobile communication subscriber, a first time switch connection unit for switching a transmitting audio signal transmitted to a mobile communication subscriber through a remote network/station interface unit and the system inside connection unit and a receiving audio signal transmitted to a fixed communication subscriber through the system inside connection unit and the remote network/station interface unit in accordance with the control signal from the time switch connection/disconnection controller, a signal input unit connected between the remote network/station interface unit and the first time switch connection unit for receiving a transmitting and receiving audio signal, an echo removing processor for detecting a difference between the transmitting audio signal and the receiving audio signal outputted from the signal input unit and for removing an echo component from the receiving audio signal in accordance with the control signal from the time switch connection/disconnection controller, and a second time switch connection unit for time-switching in order for the output signal from the echo removing processor to be transmitted to the mobile communication subscriber through the system inside connection unit in accordance with the control signal from the time switch connection/disconnection controller.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
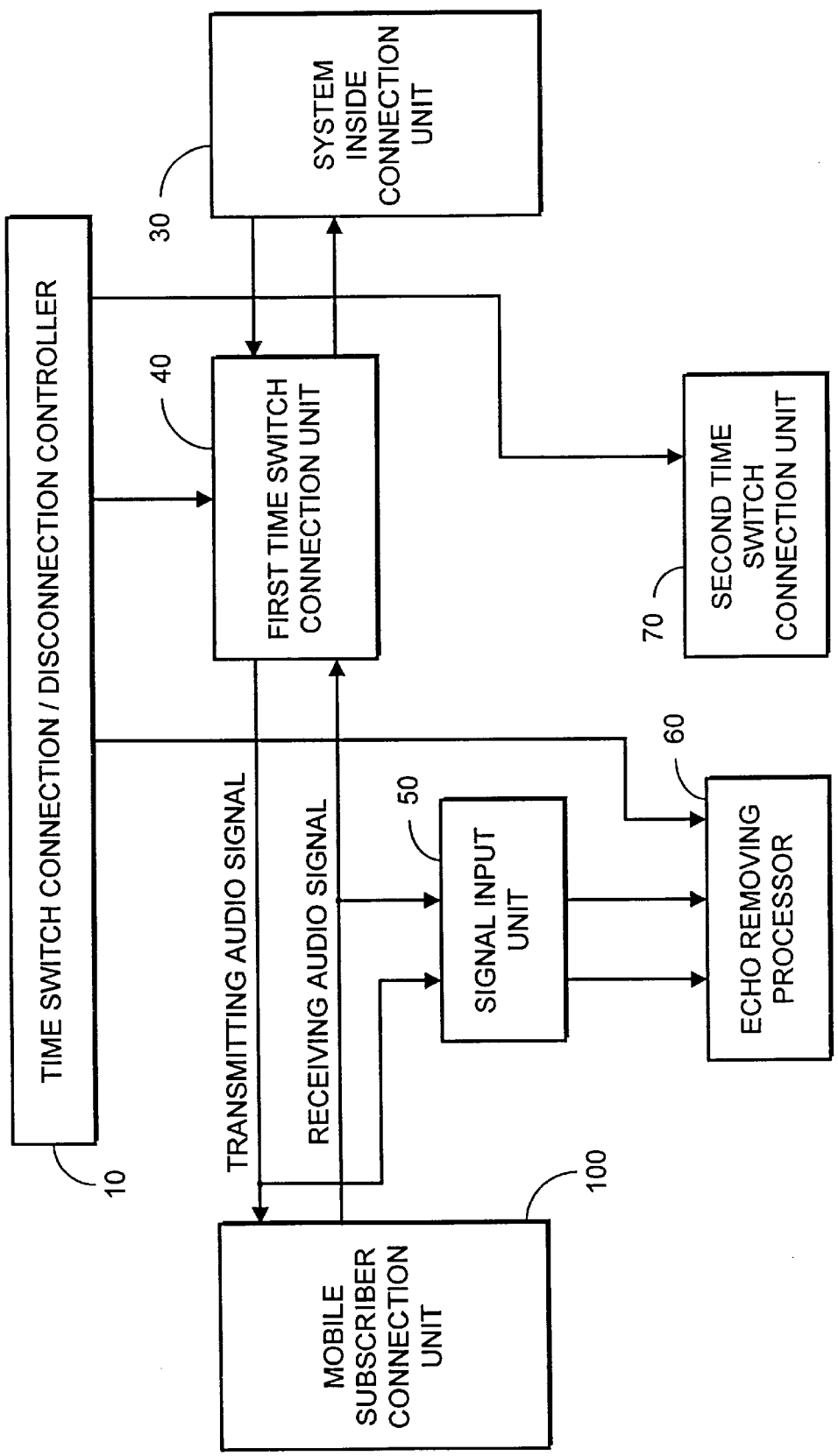
FIG. 1 is a block diagram illustrating an echo removing system so as to explain an operation of the system according to the present invention.

FIG. 1 is a block diagram illustrating an echo removing system so as to explain an operation of the system according to the present invention.

As shown therein, the echo removing system according to the present invention includes a time switch connection/disconnection controller 10 for controlling an echo removing operation, a remote network/station interface unit 20 connected to a remote network/station of a fixed communication subscriber, a system inside connection unit 30 connected to a system of a mobile communication subscriber, a first time switch connection unit 40 for switching a transmitting audio signal transmitted to the mobile communication subscriber through the system inside connection unit 30 and the remote network/station interface unit 20 and a receiving audio signal transmitted to the fixed communication subscriber through the system inside connection unit 30 and the remote network/station interface unit 20 in accordance with the control of the time switch connection/disconnection controller 10, a signal input unit 50 for receiving the transmitting and receiving audio signal between the remote network/station interface unit 20 and the first time switch connection unit 40, an echo removing processor 60 for receiving the control signal from the time switch connection/disconnection controller 10, detecting the difference between the transmitting audio signal and receiving audio signal from the signal input unit 50, and removing the echo from the receiving audio signal, and a second time switch connection unit 70 for time-switching in order for the output signal from the echo removing processor 60 to be transmitted to the mobile communication subscriber through the system inside connection unit 30.

In the drawing, reference numeral 100 denotes a mobile subscriber connection unit connected to a mobile communication subscriber.

The echo removing processor 60 is fully mounted in an access subscriber subsystem-subscriber (ASS-S) which is a fixed telephone connection control processor. In an access subscriber subsystem-trunk (ASS-T) which is a connection control processor between exchange systems, the echo removing processor 60 is mounted in only a portion where a route connected to a central gateway system (CGS) is provided.

Figure 3:
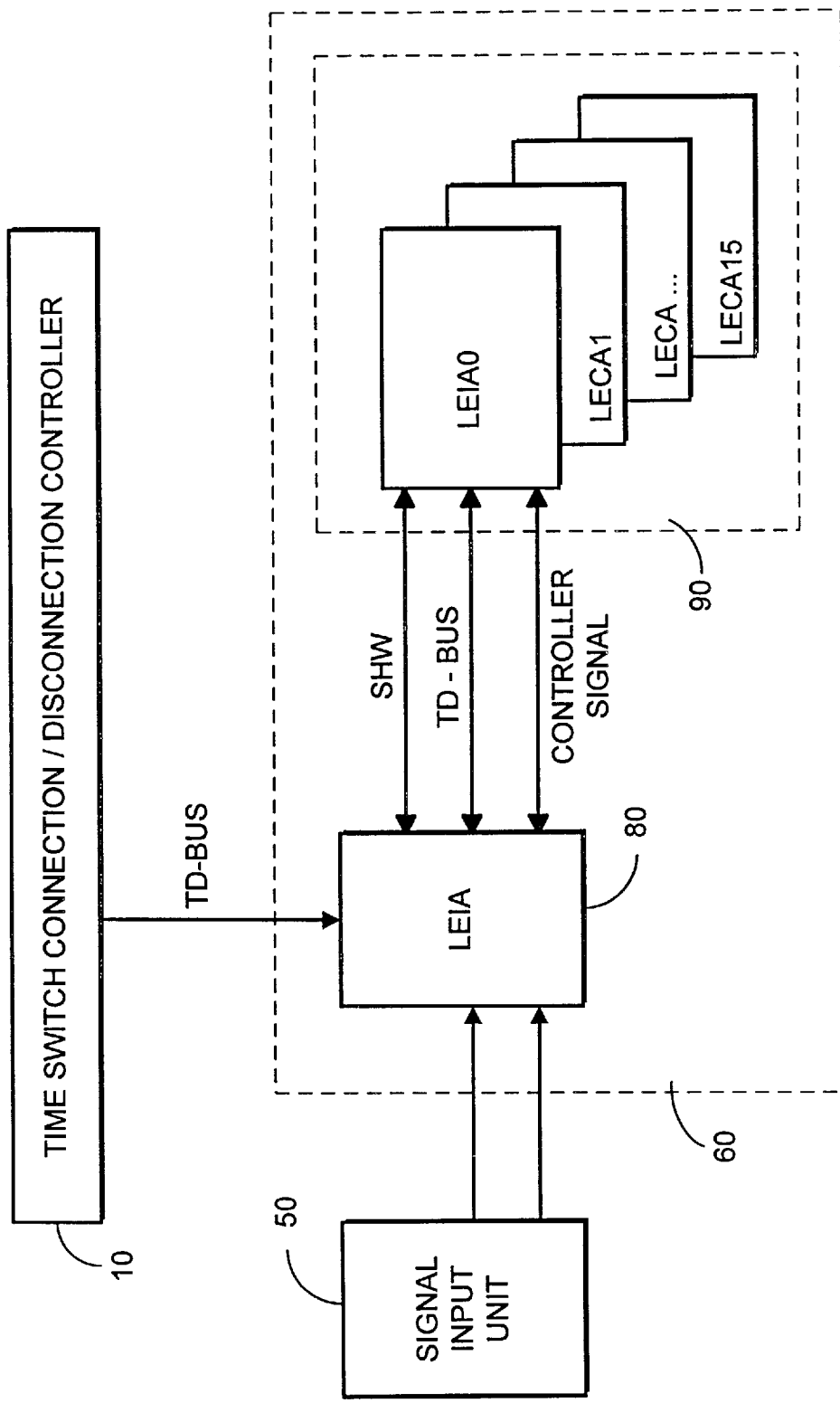
FIG. 3 is a block diagram illustrating an echo processing unit of FIG. 2 according to the present invention.
Figure 4:
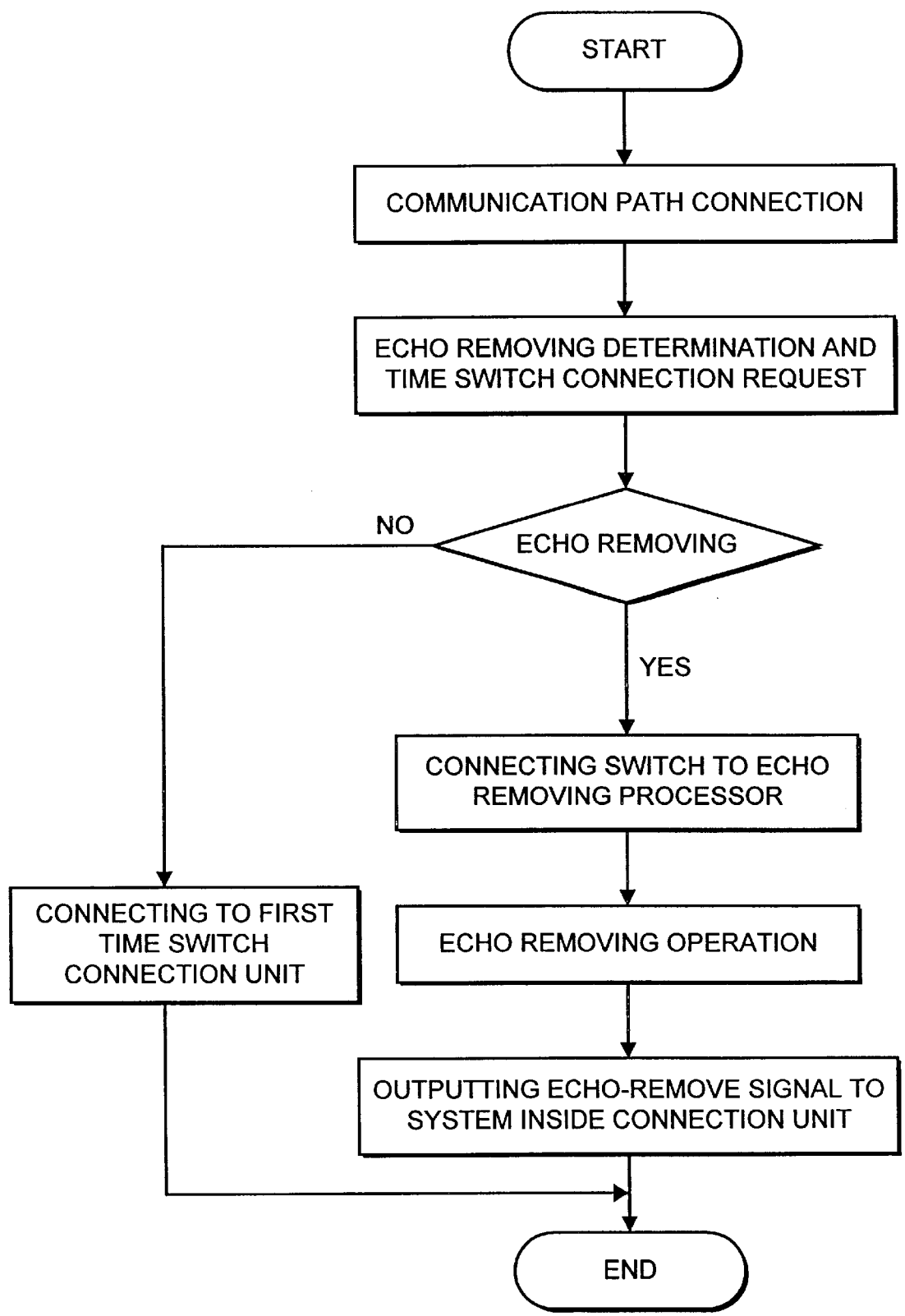
FIG. 4 is a flow chart of an operation of an echo removing system according to the present invention.

FIG. 3 is a block diagram illustrating an echo removing system so as to explain another operation of the system according to the present invention.

As shown therein, the echo removing processor 60 includes a line echo-canceler interface board assembly (LEIA) 80 connected with the time switch connection/disconnection controller 10 through a telephony device-bus (TD-BUS) for outputting a signal difference from the signal input unit 50 in accordance with the control signal from the time switch connection/disconnection controller 10, and a line echo-cancelor board assembly (LECA) 90 for selecting a specific channel corresponding to the signal from the LEIA 80 and outputting the signal from the specific channel to the second time switch connection unit 70.

In the drawing, reference character SHW denotes a frame of a time slot, and TD-BUS denotes a telephony device-bus through which the time switch connection/disconnection controller 10 controls the LEIA 80.

In addition, the LECA 90 includes eight chips per board, and four channels per one DSP chip. Therefore, one board can include thirty two channels.

Since one LEIA 80 controls sixteen boards of the LECA 90 (from $LECA_0$ to $LECA_{15}$), the echo removing processor 60 totally includes 512 channels.

Namely, the echo removing system according to the present invention is directed to obtaining a specific communication connection path during a telephone communication, determining whether an echo removing operation is performed, and requesting a connection with respect to the time switch.

In more detail, when performing a telephone communication between mobile communication subscribers, when an echo does not occur, the echo removing is not requested. In addition, when performing a telephone communication between fixed communication subscribers, when the echo occurs, the echo removing is requested. Therefore, the echo removing system removes the echo component, for thus achieving a desired quality communication.

In other words, when a mobile communication subscriber set a call, the processor which manages the called number analyzes the called number, and judges whether it is referred to a fixed/mobile/remote station/remote network subscriber.

In addition, it is informed that the echo removing apparatus is driven by the time switch connection/disconnection controller when connecting the switch by using the above-described result. If the called subscriber is referred to a mobile communication subscriber, the echo removing apparatus is not driven based on the switch connection information, and if the called subscriber is referred to the fixed subscriber/remote network/remote station subscriber, the echo removing apparatus is driven based on the switch connection information.

As shown in FIG. 1, when the telephone communication is performed between the mobile communication subscribers, and the echo removing operation is not performed, the time switch connection/disconnection controller 10 controls only the first time switch connection unit 40, passes all transmitting and receiving audio signals, and controls the second time switch connection unit 70 not to be connected.

Therefore, the audio signals from the mobile communication subscriber are transmitted to another mobile communication subscriber through the system inside connection unit 30, the time switch connection unit 40, and the mobile subscriber connection unit 100, and the audio signal from another mobile communication subscriber is transmitted to the mobile communication subscriber through the mobile subscriber connection unit 100, the first time switch connection unit 40, and the system inside connection unit 30.

Figure 2:
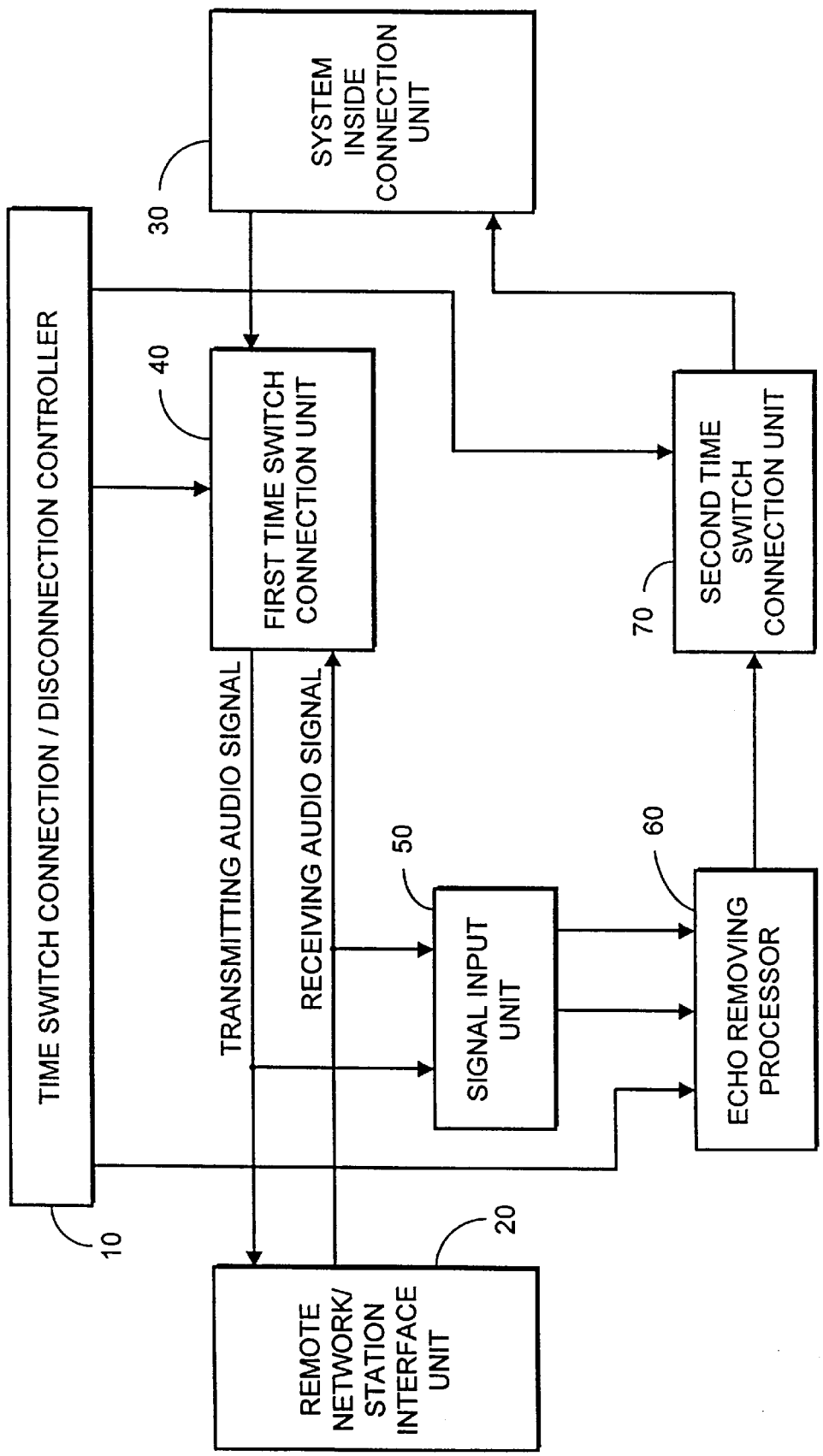
FIG. 2 is a block diagram illustrating an echo removing system so as to explain another operation of the system according to the present invention.

When the telephone communication is performed between the mobile communication subscriber and the fixed communication subscriber and the fixed communication/remote station/remote network subscriber, and the echo removing is requested, as shown in FIG. 2, the time switch connection/disconnection controller 10 controls the first time switch connection unit 40 in order for only the transmitting audio signal from the system inside connection unit 30 to be passed. In addition, the time switch connection/disconnection controller 10 controls the second time switch connection unit 70 in order for the output signal from the echo removing processor 60 to be inputted to the system inside connection unit 30 through the second time switch connection unit 70.

The transmitting audio signal of the mobile communication subscriber from the system inside connection unit 30 is transmitted to the fixed communication/remote station/remote network subscriber through the first time switch connection unit 40 and the remote network/station interface 20, and is inputted to the signal input unit 50 through the first time switch connection unit 40. In addition, the receiving audio signal of the fixed communication/remote station/remote network subscriber and the echoed audio signal from the mobile communication subscriber through the remote network/station interface unit 20 is inputted to the signal input unit 50.

When the transmission audio signal of the moible communication subscriber, the audio signal of the fixed communication/remote station/remote network subscriber, and the echoed audio signal of the mobile subscriber are inputted to the signal input unit 50, the echo removing unit 60 detects the difference between inputted audio signals, and removes the echoed audio signal of the mobile communication subscriber from the audio signal of the fixed communication/remote station/remote network subscriber, and then the audio signal of the fixed communication/remote station/remote network is transmitted to the mobile communication subscriber through the second time switch connection unit 70 and the system internal connection unit 30.

When the local network/station mobile communication subscriber transmits an audio signal, and the local network/station fixed communication subscriber receives the audio signal, the ASS-S controls the echo removing system. In addition, when the fixed communication subscriber transmits an audio signal, and the mobile communication subscriber receives the audio signal, the ASS-S controls the echo removing system as well.

During a communication between the local network/station subscriber and the remote network/station subscriber, the ASS-T interfacing with the CGS controls the echo removing system.

As described above, the echo removing system according to the present invention is directed to removing echo components by using a difference between two audio signals during a communication between the mobile communication subscriber and the fixed communication subscriber, for thus improving the communication quality.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An echo removing system between a mobile communication subscriber and a fixed communication subscriber, comprising:

a time switch connection/disconnection controller (10) for controlling an echo removing operation;

a remote network/station interface unit (20) to which the fixed communication subscriber is connected;

a system inside a connection unit (30) connected with a system of the mobile communication subscriber;

a first time switch connection unit (40) connected to the time switch connection/disconnection controller (10), so that a transmitting audio signal and a receiving audio signal are transmitted in case of a communication between the mobile communication subscriber and another mobile communication subscriber, and the transmitting audio signal of the mobile communication subscriber is transmitted in case of a communication between the mobile communication subscriber and the fixed communication subscriber, under control of the time switch connection/disconnection controller (10):

a signal input unit (50) connected between the remote network/station interface unit (20) and the first time switch connection unit (40) for receiving the transmitting signal of the mobile communication subscriber from the system inside the connection unit (30) and receiving the audio signal of the fixed communication subscriber from the remote network/station interface unit (20);

an echo removing processor (60) for detecting a difference between the transmitting audio signal of the mobile communication subscriber which is inputted through the signal input unit (50) from the first time switch connection unit (40) and the receiving audio signal of the fixed communication subscriber which is inputted from the remote network/station interface unit (20,) through the signal input unit (50) and for removing an echo component from the receiving audio signal; and a second time switch connection unit (70) connected to the time switch connection/disconnection controller (10), so that an output signal from the echo removing processor (60) is transmitted to the mobile communication subscriber through the system inside connection unit (30) under the control of the time switch connection/disconnection controller (10),wherein the first time switch connection unit (40) is disconnected.

2. The echo removing system between a mobile communication subscriber and a fixed communication subscriber of claim 1, wherein said echo removing processor (60) includes:

a line echo-canceler interface board assembly (LEIA 80) for extracting a signal difference from the signal input unit; and a line echo-canceler board assembly (LECA 90) for selecting a specific channel corresponding to the signal from the line echo-canceler interface board assembly (LEIA 80) and outputting the signal of the specific channel to the second time switch connection unit (70).

3. The echo removing system between a mobile communication subscriber and a fixed communication subscriber of claim 1, wherein said line echo-canceler board assembly (LECA 90.) includes a plurality of boards for adapting a predetermined number of channels per board.

4. The echo removing system between a mobile communication subscriber and a fixed communication subscriber of claim 2, wherein said line echo-canceler board assembly (LECA 90.) includes a plurality of boards for adapting a predetermined number of channels per board.

* * * * *